G. HARRIS.
COMBINED SEAT AND BED.
APPLICATION FILED MAY 24, 1918.

1,309,520.

Patented July 8, 1919.
2 SHEETS—SHEET 1.

Witness
R. A. Thomas.

Inventor
Grace Harris

By Victor J. Evans
Attorney

Witness
R. A. Thomas

Inventor
Grace Harris.
By Victor J. Evans
Attorney

UNITED STATES PATENT OFFICE.

GRACE HARRIS, OF MONTEREY, CALIFORNIA.

COMBINED SEAT AND BED.

1,309,520.  Specification of Letters Patent.  Patented July 8, 1919.

Application filed May 24, 1918. Serial No. 236,362.

*To all whom it may concern:*

Be it known that I, GRACE HARRIS, a citizen of the United States, residing at Monterey, in the county of Monterey and State of California, have invented new and useful Improvements in Combined Seats and Beds, of which the following is a specification.

This invention relates to combined seats and beds especially adapted to be used upon automobiles or similar vehicles and it consists in the novel features hereinafter described and claimed.

An object of the invention is to provide a combined seat and bed of the character stated which may be easily and quickly transformed from a seat to a bed or vice versa and when used as a seat the parts which constitute the bed portion are completely incased or inclosed in the seat frame. When the parts are arranged as a bed they are extended so that the occupant may comfortably occupy the same. Therefore when the parts are in the form of a bed the vehicle may be used as an ambulance for carrying injured persons. The bed may be used by campers. It may also be used by doctors for carrying sick people from their homes to hospitals and the detachable seat portion may be placed upon the ground and used as a stool or ottoman.

With these objects in view the structure includes a seat frame having a seat cushion mounted thereon and provided below the cushion with a compartment. A pair of hinged doors are arranged to close the compartment and are located one at each side of the same. A cushion is adapted to fit in the compartment but may be removed therefrom when the doors are swung to full open position. After the removable cushion has been extricated from the compartment and the doors are partially closed the said cushion may be placed upon the upper edges of the doors and therefore the upper surface of the removable cushion is placed substantially in the same horizontal plane as that in which the upper surface of the cushion mounted on the seat frame lies. Therefore the fixed cushion is provided with an extension and in the event that two or more seats are similarly equipped a bed of any desired length may be provided.

In the accompanying drawings:—

Figure 1:
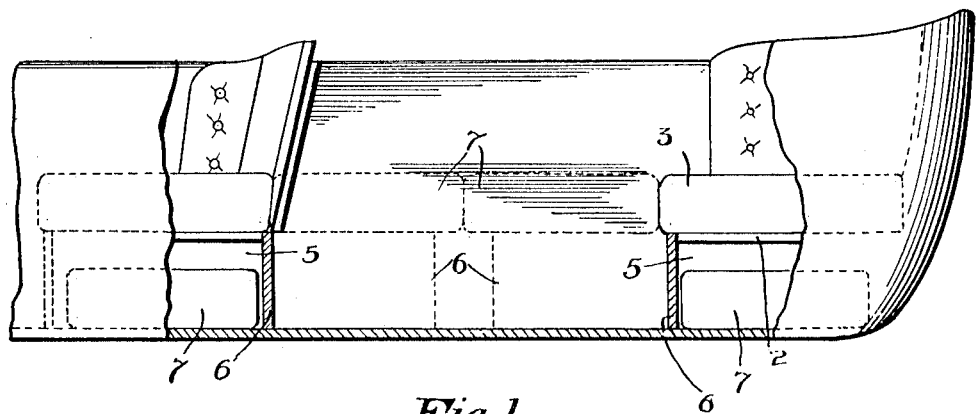
Figure 1 is a fragmentary side elevation of an automobile body with the combined seat and bed applied.
Figure 4:
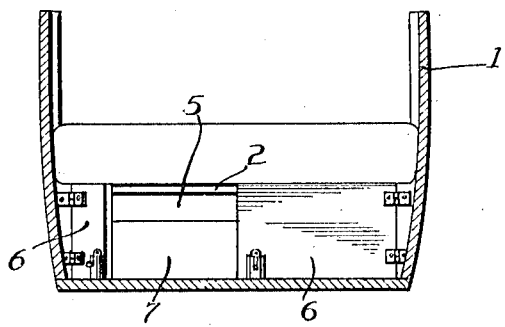
Fig. 4 is a cross section.
Figure 2:
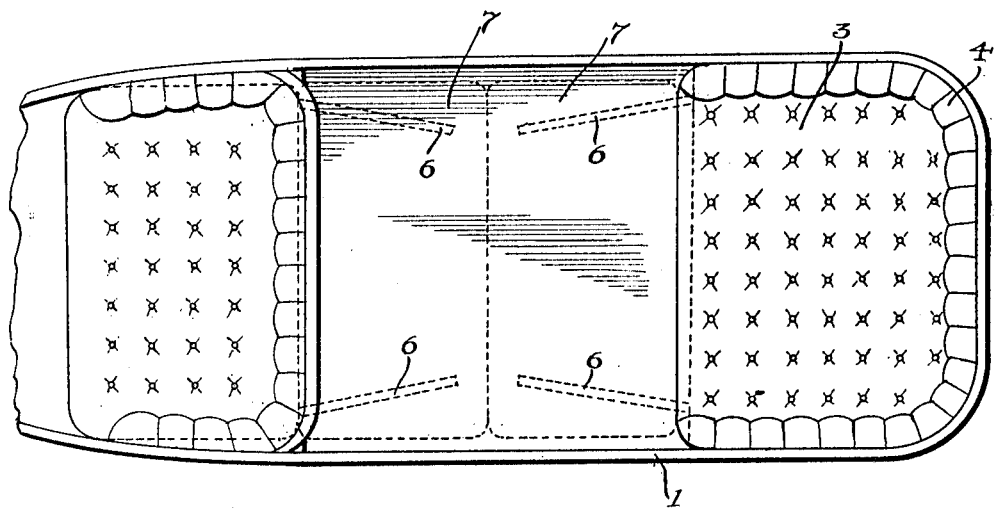
Fig. 2 is a top plan view of the same.
Figure 3:
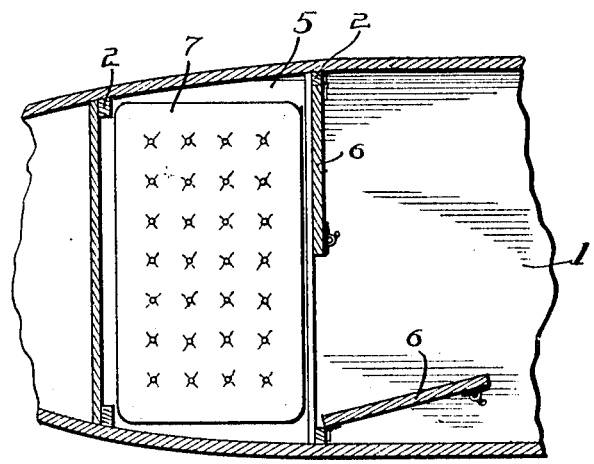
Fig. 3 is a horizontal section.

As illustrated in the accompanying drawings the body of the automobile is indicated at 1. A seat frame 2 is mounted upon the body and supports at its upper portion a seat cushion 3. The frame may also be provided with the usual back cushion 4. The seat frame 2 is provided above the floor of the body 1 and below the cushion 3 with a compartment 5. A pair of hinged doors 6 are hinged to the frame 2 at the opposite sides thereof and when in a closed position form the forward wall of the compartment 5. The compartment 5 is adapted to receive a removable cushion 7. As will be seen the front seat is similarly formed with the exception that the doors 6 are located at the rear instead of the front of the seat, said doors opening into the space between the two seats.

When the cushion 7 is located in the compartment 5 and the doors 6 are closed, the said cushion is completely incased. When it is desired to transform the structure from a seat to a bed the doors 6 are opened and the cushion 7 is removed from the compartment 5. The doors 6 are then partially closed and the cushion 7 is placed in position upon the upper edges of the doors whereby the upper surface of the cushion 7 is held substantially in the same plane as that in which the upper surface of the cushion 3 lies. Therefore the said cushions constitute a bed and may be used in the manner hereinbefore indicated.

To transform the structure from a bed to a seat the steps hereinbefore delineated are reversed.

When the seat cushions are removed they may be placed upon the ground and used as seats at picnics.

Having described the invention what is claimed is:—

1. An automobile bed comprising a seat frame and a seat cushion, said frame having a compartment provided therein below the seat cushion, a pair of doors hinged to the frame one at each side of the compartment and adapted to form a wall of the compartment when in a closed position, a movable cushion fitting in the compartment and adapted to be removed therefrom when the doors are at full open position and adapted to be supported upon the upper edges of the doors when they are at part open position whereby the upper surface of the movable cushion may be held substantially in the same plane as that in which the upper surface of the frame cushion lies.

2. In combination with the front and rear seats of an automobile having compartments below the seat cushions thereof, a pair of hinged doors closing the front of the rear compartment, a pair of hinged doors closing the rear of the front compartment and swinging rearwardly into the space between the seats, and a removable cushion in each compartment adapted to be placed on the tops of the doors when the same are in partly open position to form a bed.

In testimony whereof I affix my signature.

MRS. GRACE HARRIS.